United States Patent Office 2,822,240
Patented Feb. 4, 1958

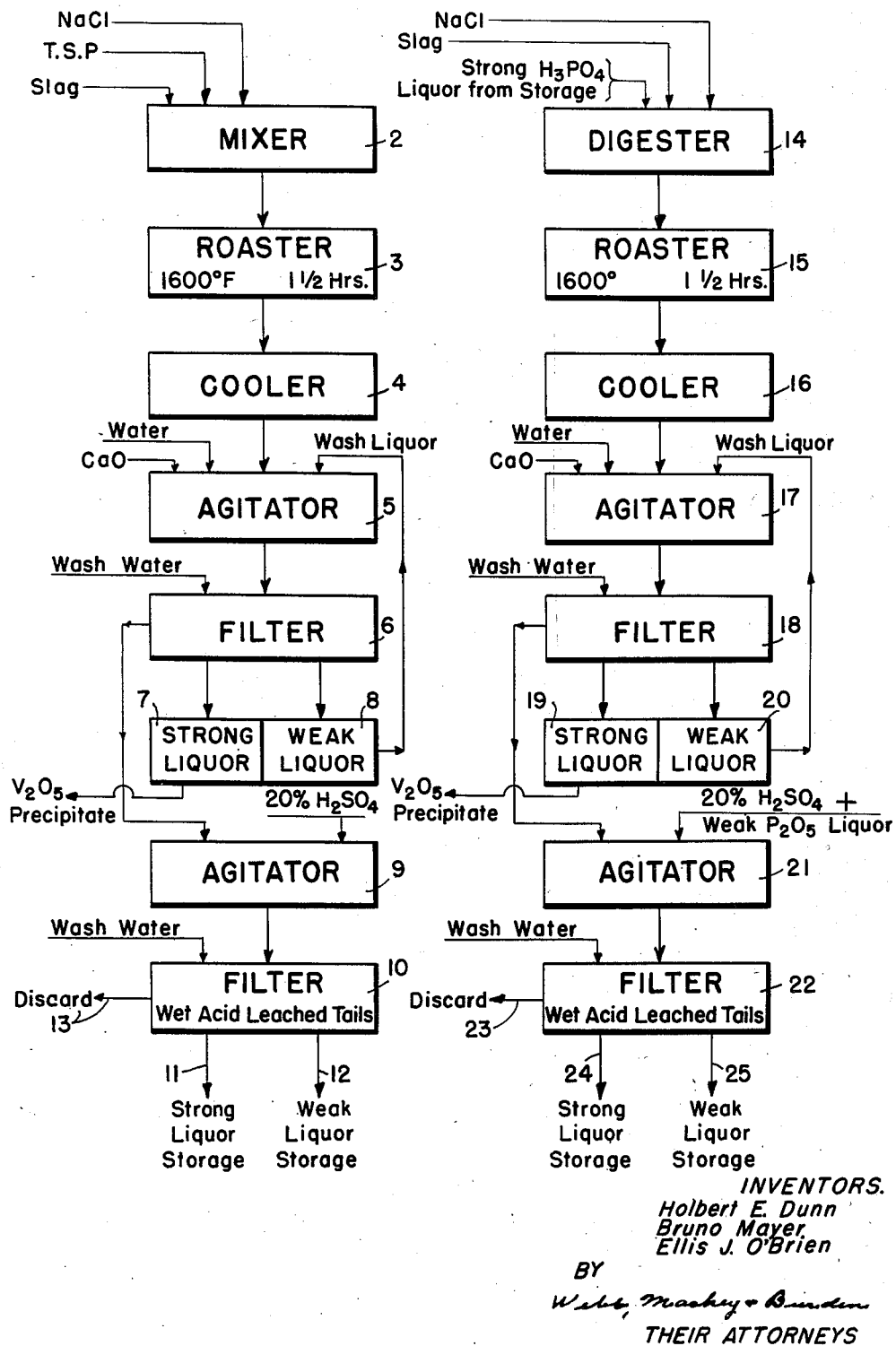

---

2,822,240

PROCESS FOR EXTRACTING VANADIUM VALUES FROM ORES, SLAGS, CONCENTRATES AND THE LIKE

Holbert E. Dunn and Bruno Mayer, Crafton, and Ellis J. O'Brien, Emsworth, Pa., assignors to Vanadium Corporation of America, New York, N. Y., a corporation of Delaware Application December 10, 1952, Serial No. 325,158

11 Claims. (Cl. 23—21)

This invention relates to a process for extracting vanadium values from refractory vanadium-containing material such as ores, slags, concentrates and the like, which contain substantially water-insoluble compounds of vanadium oxide combined with at least one basic oxide of the group consisting of CaO, MgO, MgF and MnO.

Many processes are known for roasting vanadium ores with various roasting reagents in order to convert the vanadium into a form in which it can be extracted with acid or water. Prior known processes are open to certain objections. Some of them are applicable only to the treatment of certain ores, but not others. Some of them require the use of roasting reagents which not only solubilize the vanadium, but also solubilize various other elements present such, for example, as iron and manganese, and impurities such as silica and alumina so that the leach liquor obtained by leaching the roasted ore or slag contains these undesired elements and/or compounds in such amounts as to render the recovery of the vanadium from the leach liquor impractical.

We have invented a process for treating refractory vanadium-containing ores, slags, concentrates and the like, whereby the vanadium-containing material is roasted with a combination of roasting reagents to convert the vanadium into water-soluble form. Thereafter, the roast is leached with water to extract the vanadium without extraction of undue amounts of other substances and the vanadium-containing liquor is treated with acid and heated in order to precipitate vanadium pentoxide, $V_2O_5$.

The figure is a flow sheet illustrating our process as applied in carrying out Example 1 hereinafter described.

In accordance with our invention, the vanadium-bearing ore, slag, concentrate or the like is roasted with a mixture of NaCl and an active phosphorus-bearing compound. An active phosphorus-bearing compound, as the term is used herein, may be defined as a phosphorus-bearing compound which is capable, at roasting temperature, of splitting oxide of vanadium from its compounds with the basic oxides CaO, MgO, MnO and FeO, and whose $P_2O_5$ content is capable of combining with CaO and MgO to fix them in the form of water-insoluble phosphates, while allowing the stronger basic $Na_2O$ formed from NaCl by roasting to combine with oxide of vanadium liberated by the splitting action to form water-soluble sodium metavanadate, the manganese and iron oxides being converted by roasting into water-insoluble oxides or silicates.

Thus, in accordance with Reaction I,

Reaction I

Calcium orthovanadate   Monocalcium phosphate   Salt
$3CaO.V_2O_5$ + $CaH_4(PO_4)_2.H_2O$ + $2NaCl$ ⟶
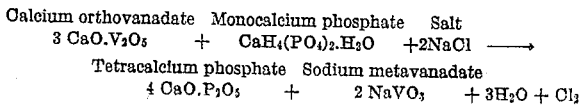
Tetracalcium phosphate   Sodium metavanadate
$4CaO.P_2O_5$ + $2NaVO_3$ + $3H_2O + Cl_2$ monocalcium phosphate, $CaH_4(PO_4)_2.H_2O$, is an active phosphorus-bearing compound since, at roasting temperature, it splits the $V_2O_5$ from the CaO of the calcium orthovanadate, $3CaO.V_2O_5$, and combines with the CaO of the calcium orthovanadate to fix it in the form of water-insoluble tetracalcium phosphate, $4CaO.P_2O_5$.

Similarly, phosphoric acid, $H_3PO_4$, is an active phosphorus-bearing compound since according to Reaction II, it is capable, at roasting temperature, of splitting $V_2O_5$ from the CaO of the calcium orthovanadate and combining with the CaO to fix it in the form of the water-insoluble tricalcium phosphate $Ca_3(PO_4)_2$.

Reaction II

$3CaO.V_2O_5 + 2H_3PO_4 + 2NaCl$
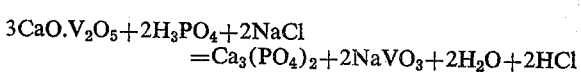
$= Ca_3(PO_4)_2 + 2NaVO_3 + 2H_2O + 2HCl$ Among the active phosphorus-bearing compounds, suitable for use according to our invention, may be mentioned:

Monosodium orthophosphate, $NaH_2PO_4.H_2O$
Sodium pyrophosphate, $Na_4P_2O_7.10H_2O$
Monocalcium phosphate, $CaH_4(PO_4)_2.H_2O$
Commercial form of monocalcium phosphate monohydrate, 46–48% available $P_2O_5$, known as Triple Superphosphate
Phosphorus pentoxide, $P_2O_5$
Phosphoric acid, $H_3PO_4$ Unless the phosphorus-bearing compound is of such character that it will split vanadium oxide from its compounds with the basic oxides mentioned, it will not "open up" the vanadium-containing material so that the $Na_2O$ formed by roasting the NaCl can react with the $V_2O_5$ in order to form the water-soluble sodium metavanadate. If the phosphorus-bearing compound used as a roasting reagent has the property of splitting the $V_2O_5$ from its compounds with the basic oxides CaO, MgO, MnO and FeO, but forms water-soluble phosphates with said basic oxides in excessive amount, then such phosphorus-bearing roasting reagents are not satisfactory for use in our process since water-leaching of the roast to extract vanadium also extracts phosphorus which contaminates the water-leach liquor and renders it difficult to precipitate vanadium pentoxide from the water-leach liquor.

Examples of inactive phosphorus-bearing compounds which are not suitable for use according to our invention are:

Tricalcium orthophosphate, $Ca_3(PO_4)_2$
Commercial form of monocalcium phosphate monohydrate, 17–20% available $P_2O_5$, known as Superphosphate These inactive phosphorus-bearing compounds do not have the property of splitting vanadium oxide from its compounds with the basic oxides CaO, MgO, MnO and FeO in amounts to render their use practical.

Examples of refractory vanadium-containing slags which can be treated according to our invention are given below, it being understood that the invention is applicable to a wide variety of vanadium-containing ores, slags, concentrates and the like. Slag A is a typical vanadium-bearing basic open hearth tap slag and slag B is a so-called basic open hearth "Flush slag" resulting from modern high hot metal practice in the operation of basic open hearth steel making.

|  | Slag A—Basic Open Hearth Tap Slag | Slag B—Basic Open Hearth Flush Slag |
|---|---|---|
| Percent: | | |
| $V_2O_5$ | 2.89 (1.62% V) | 4.66 (2.61% V). |
| $SiO_2$ | 12.78 | 20.62. |
| $CaO$ | 39.53 | 21.87. |
| $MgO$ | 8.47 | 6.52. |
| $MnO$ | 11.32 (8.77% Mn) | 15.00 (11.62% Mn). |
| $FeO$ | 18.64 (14.49% Fe) | 21.55 (16.75% Fe). |
| $P_2O_5$ | 3.07 (1.34% P) | 2.90 (1.27% P). |
| $TiO_2$ | 2.89 | 3.00. |
| $Al_2O_3$ | 0.83 | 1.59. |
| $Cr_2O_3$ | 0.92 | 0.79. |

| Ratios | Slag A | Slag B |
|---|---|---|
| $\dfrac{\text{Percent wt. CaO}}{\text{Percent wt. SiO}_2+\text{percent wt. P}_2O_5}$ | 2.49 | 0.93 |
| $\dfrac{Fe}{V}$ | 8.94 | 6.42 |
| $\dfrac{Mn}{V}$ | 5.41 | 4.45 |
| $\dfrac{CaO}{V}$ | 24.40 | 8.37 |
| $\dfrac{V}{P}$ | 1.21 | 2.05 |

Various known roasting reagents were used in roasting slags A and B, but they did not give satisfactory results.

Slag A when roasted at 1600° F. for 1½ hours with 20-28 parts salt per 100 parts slag and leached with water yielded only 4–5% of water-soluble vanadium. Slag A when roasted at 1400° F. for 1½ hours with as much as 40% of soda ash per 100 parts of slag and then leached with water, yielded only 43% of water-soluble vanadium. This amount of soda ash is economically prohibitive.

Slag B when roasted at 1600° F. for 1½ hours with 28 parts salt per 100 parts slag gave no appreciable content of water-soluble vanadium.

When slag B, either raw or pre-roasted in air, was roasted at 1600° F. for 1½ hours with 50 parts $Na_2CO_3$ per 100 parts slag, 75% of the vanadium was extracted by water-leaching. When slag B was roasted at 1500° F. for 1½ hours with 50 parts $Na_2CO_3$ per 100 parts slag, only 63½% of the vanadium was extracted by water-leaching. When slag B was roasted at 1600° F. for 1½ hours with 30 parts $Na_2CO_3$ per 100 parts slag, only 36% of the vanadium was extracted by water-leaching. When such roasts are extracted by water leaching, the solution carries one-third as much silica as vanadium, which renders such solutions difficult to precipitate and filter and results in such badly contaminated product as to necessitate redissolution and reprecipitation or purification of the leaching liquor by removal of the silica, with their attendant losses of vanadium values and added expense, while less severe roasting attack as by decreased soda ash or temperature lowers the vanadium recovery below feasible limits.

Vanadium is known to readily form relatively stable compounds such as calcium orthovanadate, $3CaO.V_2O_5$, manganese spinels, $2MnO.V_2O_3$, and iron spinels, $2FeO.V_2O_3$, which are very refractory even if not altogether unresponsive to the simple salt-roast, water-leach treatment, not only in their relatively pure state, but even when present in the more diluted state in pyrometallurgical slags and natural ores.

Since the open hearth flush slag B apparently contains at least all three of the known refractory vanadium compounds just mentioned and since it represents a world source of vanadium which is rapidly rising in commercial importance, this slag was subjected to an exhaustive series of tests for the purpose of ascertaining the comparative results obtained by the use of known roasting reagents and conditions, as well as the roasting reagents and conditions employed according to the present invention. The tests involved grinding the slag to various finenesses, employing various roasting reagents and combinations of roasting reagents at various roasting temperatures and times of roasting, quenching the roast either in air or in water, and leaching the quenched roast in water for various leaching times. The results obtained by using optimum roasting conditions (usually 1600° F. for 1½ hours) for each roasting reagent or combination of roasting reagents are given below. The proportions are by weight.

(1) Phosphoric acid in amount sufficient to provide 12.6 parts $P_2O_5$ per 100 parts of slag yielded only traces of water-soluble vanadium with 98.1% of the $P_2O_5$ retained in the leaching tailings.

(2) Phosphoric acid in amount sufficient to provide 12.6 parts $P_2O_5$ per 100 parts of slag and 30% of salt, NaCl, yielded 79.3% of water-soluble vanadium, while phosphorus extraction was negligible.

(3) Common salt, NaCl, in an amount of 28 parts per 100 parts of slag yielded only 4.65% of water-soluble vanadium.

(4) The same roast as given in paragraph 3, when leached in 5% soda ash solution, yielded 8.75% water-soluble vanadium.

(5) Monosodium phosphate, $NaH_2PO_4.H_2O$, in an amount of 37% and common salt in an amount of 30%, based on the weight of the slag yielded a water-soluble vanadium content of 77.09%.

(6) Monosodium phosphate, $NaH_2PO_4.H_2O$, in amount of 37%, but without common salt, yielded a water-soluble vanadium content of only 2.37%, when roasted and leached under the same conditions as item 5.

(7) Sodium pyrophosphate, $Na_4P_2O_7.10H_2O$, in amount to provide 19.08 parts $P_2O_5$ per 100 parts slag, and 30% of common salt (the optimum percentages of these ingredients) yielded 71.4% of water-soluble vanadium.

(8) Sodium pyrophosphate, $Na_4P_2O_7.10H_2O$, in amount to provide 19.08 parts $P_2O_5$ per 100 parts slag, but without common salt, yielded only 1.36% of water-soluble vanadium, when roasted and leached under the same conditions as item 7.

Since the theoretical quantity of NaCl required to form the water-soluble sodium metavanadate, $NaVO_3$, amounts to only 3 parts per 100 parts of the slag, based on its $V_2O_5$ content of 4.66%, it was entirely unexpected to find that the ample $Na_2O$ content of the sodium phosphates used in items 6 and 8 did not so function, but required instead the actual addition of NaCl itself to the sodium phosphates as in items 5 and 7 in order to form the water-soluble sodium vanadate.

(9) Tricalcium phosphate, $Ca_3(PO_4)_2$, in an amount sufficient to provide 19 parts of $P_2O_5$ per 100 parts of slag, and 30 parts of common salt, NaCl, per 100 parts of slag, yielded only 11.8% of water-soluble vanadium.

(10) Monocalcium phosphate, $CaH_4(PO_4)_2$, in amount sufficient to provide 19.7 parts $P_2O_5$ per 100 parts of slag, and 30 parts of NaCl, yielded 76.80% of water-soluble vanadium.

(11) Commercial calcium phosphate fertilizer known as "Superphosphate" (containing about 20% available $P_2O_5$) in amount sufficient to provide 21.6 parts $P_2O_5$ per 100 parts of slag, and 30% of NaCl (the optimum proportions of these ingredients) yielded only 30% of water-soluble vanadium.

(12) Commercial calcium phosphate fertilizer known as "Triple Superphosphate" (containing about 47% available $P_2O_5$) in amounts sufficient to provide from 17.8 to 23.8 parts $P_2O_5$ per 100 parts of slag, and 30% of NaCl, yielded 73 to 83% of water-soluble vanadium.

Since commercial phosphoric acid or sodium phosphates or calcium phosphates in the form of Superphosphate cost about 4 times as much as commercial Triple Superphosphate of fertilizer grade (containing 47–48% $P_2O_5$)

for a given amount of $P_2O_5$, it is preferred to use Triple Superphosphate, sometimes hereinafter termed "T. S. P.," as the source of $P_2O_5$ in the roasting reagent.

By a series of tests on slag B, the following optimum conditions were established. The slag should be magnetically cleaned at about 40–60 mesh and then ground to pass 100 mesh before it is mixed with the roasting reagents. The mixture to be roasted should contain about 35–50 parts of 35 mesh T. S. P. (containing about 47.5% $P_2O_5$), or about 16–24 parts of $P_2O_5$, and 8–40 parts, preferably 20–35 parts by weight of NaCl, per 100 parts of slag. The mixture should be roasted for 1½ hours at 1600° F. while being rabbled, after which it is preferably air-cooled, ground to 35 mesh, and water-leached in hot, 190° F. to boiling, water.

The following is an example of a preferred manner of carrying out our process on slag B, reference being made to the accompanying flow sheet, Figure 1.

EXAMPLE 1

One ton of the open hearth flush slag B of the analysis previously given, magnetically cleaned at 40–60 mesh and ground to pass 100 mesh, is mixed in mixer 2 with 800 lbs. of commercial Triple Superphosphate (containing nominally 47.5% of $P_2O_5$) and 500 lbs. of NaCl. This mixture is then roasted in a rotary kiln or mechanically rabbled in roaster 3 at a temperature of 1600° F. for 1½ hours, after which it is air-cooled in a cooler 4. The air-cooled calcine is fed to an agitator 5 together with 400 gallons of water and 2½ lbs. of lime and the slurry is leached for ½ hour at a temperature of about 190° F. When the water-leaching carried out in agitator 5 is performed without the addition of lime, the leach liquor usually contains small quantities of $P_2O_5$ in solution, and when the solution is treated with sulphuric acid to precipitate $V_2O_5$, the precipitate is contaminated with the $P_2O_5$. When, however, lime is employed in the water-leaching operation, the $P_2O_5$ in solution is precipitated as tricalcium phosphate, $Ca_3(PO_4)_2$, which is removed along with the tailings by filtration.

The slurry from the agitator 5 is passed to a filter 6 where the tailings are separated from the leaching liquor. The tailings are washed with water and the filtrate is divided into a strong liquor 7 and a weak liquor 8. The weak liquor 8 is returned to the agitator 5 for treatment of a further quantity of calcine. The strong liquor 7 is treated with sulphuric acid to precipitate vanadium pentoxide $V_2O_5$.

The strong liquor 7 analyzes, typically, as follows:

Water leach liquor, gms./liter
| | |
|---|---|
| $V_2O_5$ | 22.7 |
| $P_2O_5$ | 0.024 |
| $Al_2O_3$ | 0.45 |
| $SiO_2$ | 0.50 |
| MnO | None |
| $Cr_2O_3$ | Trace |

The precipitated vanadium pentoxide product known as "Red Cake" analyzes, typically, as follows:

Precipitated product
| | |
|---|---|
| $V_2O_5$ | 92.90% (fused basis). |
| $P_2O_5$ | 0.036. |
| $Al_2O_3$ | |
| $SiO_2$ | |
| MnO | None. |
| $Cr_2O_3$ | Trace. |

A precipitating efficiency of 98.6% of the vanadium is obtained at a sulphuric acid consumption of 0.54 lb. (100%) $H_2SO_4$ per lb. of $V_2O_5$. In carrying out the $V_2O_5$ precipitation, the vanadium solution preferably is heated to 78° C. and mixed with the required quantity of 66° Baumé sulphuric acid and further heated to 97° C. with agitation for 1½ hours, as described in Dunn et al. Patent 2,551,733 granted May 8, 1951. The vanadium pentoxide thus produced is a high grade article of commerce satisfactory for the manufacture of the best grades of ferro-vanadium, as well as for other uses of this oxide product.

The water-leached tailings (water-insoluble residue) separated on filter 6 weigh 1.3 tons and analyze, typically, as follows:

| | Percent |
|---|---|
| $V_2O_5$ | 0.84 (0.47% V) |
| MnO | 11.54 |
| FeO | 17.00 |
| $Al_2O_3$ | 1.60 |
| $SiO_2$ | 16.80 |
| CaO | 23.30 |
| MgO | 5.02 |
| $P_2O_5$ | 16.84 |
| $Cr_2O_3$ | 0.61 |
| $TiO_2$ | 2.31 |
| $Na_2O$ | 2.65 |

Since this water-leached residue still contains 22% of the total vanadium content of the slag, as well as the $P_2O_5$ content of the slag, and practically 100% of the $P_2O_5$ added as T. S. P. (less than ½ of 1% is lost in roasting), it is essential to recover as much of both of these values as is economically feasible. It will be noted that the water-leached residue contains relatively high contents of MgO, MnO, FeO and $SiO_2$ which would interfere with the extraction of vanadium and phosphorus by the treatment of the water-leached residue with sulphuric acid in the manner commonly practiced in making phosphoric acid from phosphate rock, apatite, and other phosphate raw materials. The presence of the impurities above mentioned in the water-leached residue would result in the formation of permanent jellies or gels which would prevent filtration, hinder drying and otherwise render the usual sulphuric acid digestion process inoperative or uneconomical.

The above represents a typical extraction procedure as practiced within the scope of the novel method of our invention. Added significance is imparted to this method by subsequent steps designed to extract the remainder of the vanadium and recover the reagent. Notwithstanding the high impurity contents in the water-leached residue, we have found that 60 to 68% of the $V_2O_5$ content and 91.5 to 95% of the $P_2O_5$ content of the water-leached residue can be extracted by "flash leaching" with 95 to 100% of the theoretical quantity of 20 to 25% sulphuric acid as computed for the $P_2O_5$ content of the water-leached residue considered to be present as tricalcium phosphate, and for complete decomposition as expressed by the Reaction III:

Reaction III

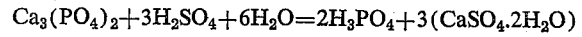

$$Ca_3(PO_4)_2 + 3H_2SO_4 + 6H_2O = 2H_3PO_4 + 3(CaSO_4 \cdot 2H_2O)$$

According to this equation, 1 part of $P_2O_5$ as tricalcium phosphate requires 2.07 parts $H_2SO_4$ to extract the $P_2O_5$ as orthophosphoric acid while converting the lime to gypsum.

In order to carry out this "flash leaching," the water-leach residue from filter 6 is mixed with water to form a slurry containing 55 to 65% of solids and is fed to agitator 9 in a flowing stream together with a flowing stream of 20 to 25% sulphuric acid previously heated to a temperature of 70 to 76° F. The mixture is subjected to thorough agitation in the agitator 9 and quickly delivered to a filter 10. During stirring in the agitator 9, the pulp begins to swell and becomes jelly-like, but as the stirring is continued, it develops an even, smooth, pouring consistency in about 1½ minutes, at which time it is poured quickly onto the filter 10. The total time of agitation in the agitator 9 and delivery of the slurry to the filter 10 should preferably not exceed 2 to 3 minutes, since there is a noticeable decrease in filtering rate as the overall contact time is extended to as much as 7 minutes. If the overall contact time is as long as 20 to 30 minutes, the filtering rate drops to almost zero and the process becomes less and less operative. The sulphuric acid concentration used in the agitator 9 should be between 20 and 25%, preferably 20%, in order to obtain maximum extraction of vanadium and phosphorus but minimum extraction of other slag constituents. If the reaction proceeds too fast, the pulp becomes lumpy and very viscous, while if conducted too slowly, acid attack is more general and the jelly-like pulp becomes more and more difficult to filter and wash on conventional suction filters. The filter 10 may be a rotary drum filter having a rocker-type bowl agitator. The normal speed of such rocker-type bowl agitator (15 strokes per minute) is sufficient to break the thick pulp and load the filter drum evenly, but does not break the gel.

Typical analyses of the strong phosphoric acid liquor 11 (strong P. A. L.) and the weak phosphoric acid liquor 12 (weak P. A. L.) coming from the filter 10 are as follows:

|  | Strong P. A. L. (Gms./Liter) | Weak P. A. L. (Gms./Liter) |
|---|---|---|
| $V_2O_3$ | 3–6.0 | 2–5.0 |
| $P_2O_5$ | 90–105 | 35–60 |
| $MnO$ | 8.80 | 4.40 |
| $FeO$ | 6.90 | 3.06 |
| $CaO$ | 1.92 | 1.35 |
| $SiO_2$ | 1.68 | 0.40 |
| $Al_2O_3$ | 1.20 | 0.60 |
| $SO_3$ | 9.25 | 2.30 |

Typical analysis of the acid-leached discard tailings 13 is as follows:

|  | Acid leached tailings (Percent by weight) |
|---|---|
| $V_2O_5$ | 0.15–0.25% V |
| $P_2O_5$ | 0.80–1.50 |
| $MnO$ | 8.50–12.00 |
| $FeO$ | 14.38 |
| $CaO$ | 20.33 |
| $SiO_2$ | 14.48 |
| $Al_2O_3$ | 1.67 |
| $SO_3$ | 20.38 |

The recovered strong phosphoric acid liquor 11, if necessary, is then adjusted in concentration by dilution with weak phosphoric acid liquor 12 to the optimum concentration range of 96 to 103 grams $P_2O_5$ per liter, preferably 100 grams per liter, and heated to 70–76° F., and is then used to treat a further quantity of slag.

A typical unit mix including the further quantity of slag comprises:

490 gallons strong phosphoric acid liquor containing 103.1 gms./liter of $P_2O_5$,
500 pounds of NaCl, and
2,000 pounds of raw 100 mesh magnetically-cleaned slag.

This unit mix is heated in a steam-jacketed digester 14 of the repulping trough type, fitted with a paddle agitator operating at 70 R. P. M., to a temperature of 50 to 55° C., for a period of about 20 to 30 minutes so as to thicken it to a safe pumping consistency after which it is pumped into a rotary calcining or roasting kiln 15, where it is roasted at 1600° F. for 1½ hours.

It is preferred that the concentration of phosphoric acid used in the digester 14 be between 96 and 103 grams $P_2O_5$ per liter, since within these limits of phosphoric acid concentration the maximum percentages of water-soluble vanadium are obtained after roasting, cooling, and water-quenching. The acid concentration in the digester 14 may, however, be as low as about 50 grams per liter of $P_2O_5$ or as high as 105 grams per liter of $P_2O_5$ and still obtain satisfactory recoveries of water-soluble vanadium.

If instead of conducting the digestion in the digester 14 at a temperature of 50 to 55° C., the mass is heated to 66 to 71° C., a very plastic reaction mass results which must be mechanically conveyed or charged to the roaster 15. If the heating in digester 14 is at a temperature of 107° C., the product is a bone-dry, soft, light gray, powdery cake which can be readily transferred to the roaster 15.

Resuming the description of the typical procedure of Example 1, after roasting in the roaster 15, the calcine is cooled in air in cooler 16, lime is added, and the mixture is leached with water in agitator 17 and the slurry is filtered on filter 18. The filtrate is divided into strong liquor 19 and weak liquor 20 and the weak liquor 20 is returned to the agitator 17 for treating a further quantity of calcine. The strong vanadium liquor 19 containing 19.64 grams per liter $V_2O_5$ is heated to 78° C. and mixed with the required quantity of 66° Baumé sulphuric acid and further heated to 97° C. with agitation for 1½ hours, thereby precipitating $V_2O_5$ at a precipitating efficiency of 98.8%. The sulphuric acid consumption is 0.54 pound $H_2SO_4$ per pound $V_2O_5$ recovered, and the analysis of the typical product is:

$V_2O_5$ _____ 93.90% (fused basis)
$P_2O_5$ _____ 0.02
$Cr_2O_3$ _____ 0.01 a high grade product comparable to that obtained on the initial "Triple Superphospate" roast.

The water-leach residue remaining on the filter 18 amounts to 1.29 tons of dry solids per ton of raw slag treated and analyzes typically as follows:

|  | Percent |
|---|---|
| $V_2O_5$ | 0.75 |
| $FeO$ | 18.84 |
| $MnO$ | 14.30 |
| $Al_2O_3$ | 1.30 |
| $CaO$ | 18.50 |
| $SiO_2$ | 16.74 |
| $P_2O_5$ | 19.00 |

The water-leached tailings from filter 18 are agitated in agitator 21 with 20% concentration sulphuric acid as previously described together with weak $P_2O_5$ liquor, in order to extract vanadium and phosphorus and produce phosphoric acid. The slurry is filtered on filter 22 and the tailings 23 are discarded. The filtrate is divided into strong phosphoric acid liquor 24 and weak phosphoric acid liquor 25, which are used together with NaCl for treating a further quantity of slag in a third cycle not shown.

Recycling and reuse of recovered phosphoric acid is in no way essential to the fundamental operation of our process, which attains a practical recovery of vanadium to the extent of 73 to 83% without recycling when Triple Superphosphate and NaCl are used as the roasting reagents. However, recovery of the phosphorus as above described does increase the overall vanadium extraction by 10 to 14%, by returning it to the circuit along with the phosphorus, since this vanadium is also solubilized by the subsequent salt-roast and passes into the water-leaching liquor for precipitation as Red Cake, $V_2O_5$, to give an overall vanadium extraction leveling off at 92 to 94% after the third recycle. At current levels of roasting reagent cost prices and such related cost factors, present economy indicates that at least 4 recycles of recovered phosphoric acid should be practiced. This amounts to 20% constant usage of Triple Superphosphate, thus requiring only 80% recovery of the added Triple Superphosphate to maintain the system.

In the practice of our invention, we use the following premises and reactions, and in actual practice they have proven to be satisfactory guides in applying the invention to specific operations conducted in accordance with it.

(a) A part of the CaO in the slag to be treated for extraction of vanadium is combined with the $P_2O_5$ in the slag as water-insoluble tricalcium phosphate, $Ca_3(PO_4)_2$.

(b) A part of the CaO in the slag is combined with the $V_2O_5$ in the slag as water-insoluble calcium orthovanadate, $3CaO.V_2O_5$.

(c) The part of the CaO in the slag which is not combined as in (a) or (b) above is combined with the silica in the slag as water-insoluble dicalcium silicate, $2CaO.SiO_2$.

By employing these premises in conjunction with the following reactions, we can determine the amounts of NaCl and phosphate-bearing material which should be used in roasting the vanadium-containing ore, slag or concentrate. This enables us to carry out the treatment of refractory vandaium-bearing steel slags and widely differing natural ores and concentrates which are not amenable to ordinary salt-roasting procedures and still obtain high extraction of vanadium by water-leaching the roasted vanadium-containing material.

Reaction I

Calcium orthovanadate  Monocalcium phosphate  Salt
$$3CaO.V_2O_5 + CaH_4(PO_4)_2.H_2O + 2NaCl \longrightarrow$$
Tetracalcium phosphate  Sodium metavanadate
$$4CaO.P_2O_5 + 2NaVO_3 + 3H_2O + Cl_2$$

In this reaction, 1 part of $V_2O_5$ as water-insoluble calcium orthovanadate requires 0.643 part by weight of NaCl and 1.385 parts by weight of monocalcium phosphate or 0.78 part $P_2O_5$ to form the water-soluble sodium metavanadate and water-insoluble tetracalcium phosphate.

Reaction II $$3CaO.V_2O_5 + 2H_3PO_4 + 2NaCl$$
$$= Ca_3(PO_4)_2 + 2NaVO_3 + 2H_2O + 2HCl$$

In this reaction, 1 part of $V_2O_5$ requires 0.643 part by weight of NaCl and 1.077 parts by weight of $H_3PO_4$ or 0.78 part $P_2O_5$.

Reaction IV

Dicalcium silicate  Monocalcium phosphate  Salt
$$2CaO.SiO_2 + CaO.P_2O_5.3H_2O + 4NaCl \longrightarrow$$
Water-insoluble double lime-soda silicophosphate
$$3CaO.2Na_2O.SiO_2.P_2O_5 + 4HCl + H_2O$$

In this reaction, 1 part of CaO as dicalcium silicate requires 2.09 parts of NaCl and 2.31 parts monocalcium phosphate or 1.3 parts $P_2O_5$ to form the water-insoluble double lime-soda silicophosphate.

Reaction V $$2[2CaO.SiO_2] + 2H_3PO_4 + 2H_2O + 8NaCl$$
$$= 4CaO.4Na_2O.2SiO_2.P_2O_5 + 1H_2O + 8HCl$$

In this reaction, 1 part of CaO as dicalcium silicate requires 2.09 parts of NaCl and 0.875 part $H_3PO_4$ or 0.635 part $P_2O_5$.

In determining the amount of phosphate material and the amount of NaCl to be used in the roasting operation according to our invention, we use the following steps:

(1) Calculate the amount of CaO required to react with the $P_2O_5$ in the slag to form water-insoluble tricalcium phosphate, $Ca_3(PO_4)_2$ (1 part $P_2O_5$ requires 1.184 parts CaO).

(2) Calculate the amount of CaO required to react with the $V_2O_5$ in the slag to form $3CaO.V_2O_5$ (1 part $V_2O_5$ requires 0.923 part CaO).

(3) Subtract the total CaO of Steps 1 and 2 from the amount of CaO in the slag to give the amount of CaO available for forming dicalcium silicate, $2CaO.SiO_2$.

(4) Calculate the amount of $P_2O_5$ and NaCl required to react according to Reaction IV or Reaction V with the dicalcium silicate to form the water-insoluble double lime-soda silicophosphate.

(5) Calculate the amount of $P_2O_5$ and NaCl required to react according to Reaction I or Reaction II with the $V_2O_5$ and CaO in the slag to form the water-soluble sodium metavanadate and the water-insoluble tetracalcium phosphate.

(6) Add the $P_2O_5$ and NaCl of Steps 4 and 5, and use these amounts in the roasting operation.

Some illustrations of the method of calculating the amounts of sodium chloride and $P_2O_5$ or Triple Superphosphate or monocalcium phosphate or phosphoric acid to be used in the roast according to our invention will now be given.

Illustration 1

Dry roast of open hearth flush slag B having the analysis:

4.66% $V_2O_5$
20.62% $SiO_2$
21.87% CaO
2.90% $P_2O_5$

Dry roasting mix: 100 parts raw slag, 100 mesh, magnetically cleaned—

(Step 1) 2.90% $P_2O_5 \times 1.184 = 3.43\%$ CaO required to form $Ca_3(PO_4)_2$ (Step 2) 4.66% $V_2O_5 \times 0.923 = 4.30\%$ CaO required to form $3CaO.V_2O_5$ (Step 3) 21.87% CaO $-3.43-4.30 = 14.14\%$ CaO remaining for combination with silica as dicalcium silicate By Reaction IV:

(Step 4) 14.14% CaO$\times 2.31 = 32.66\%$ M. C. P. (monocalcium phosphate) required (Step 4) 14.14% CaO$\times 2.09 = 29.55\%$ NaCl required By Reaction I:

(Step 5) 4.66% $V_2O_5 \times 1.385 = 6.45\%$ M. C. P. required (Step 5) 4.66% $V_2O_5 \times 0.643 = 3.00\%$ NaCl required Total dry roasting reagents by Reactions IV+I:

(Step 6) $= 32.66 + 6.45 = 39.11$ parts M. C. P. per 100 parts of slag (Step 6) $= 29.55 + 3.00 = 32.6$ parts NaCl per 100 parts of slag Chemically pure monocalcium phosphate contains 56.4% $P_2O_5$ while the much cheaper form of commercial "Triple Superphosphate" (T. S. P.) contains about 47% $P_2O_5$ in the so-called "available" or "active" form. Thus the amount of Triple Superphosphate required would be 1.2 times the amount of monocalcium phosphate. On this basis, the roasting mix becomes:

100 parts raw slag, ground to 100 mesh and magnetically cleaned,
47 parts Triple Superphosphate, or 22 parts $P_2O_5$, and
32.6 parts common salt, NaCl

Illustration 2

Wet roast of open hearth flush slag B of the analysis given in Illustration 1:

By Reaction V:

(Step 4) 14.14% CaO$\times 0.875 = 12.375$ $H_3PO_4$ or $14.14 \times 0.635 = 8.98$ parts $P_2O_5$ (Step 4) 14.14% CaO$\times 2.09 = 29.55\%$ NaCl required By Reaction II:

(Step 5) 4.66% $V_2O_5 \times 1.077 = 5.02\%$ $H_3PO_4$ or $4.66 \times 0.78 = 3.63\%$ $P_2O_5$ (Step 5) 4.66% $V_2O_5 \times 0.643 = 3.00\%$ NaCl required Total wet roasting reagents by Reactions V and II:

$= 12.375 + 5.02 = 17.395$ parts $H_3PO_4$ or $8.98 + 3.63 = 12.61$ parts $P_2O_5$ per 100 parts of slag
$= 29.55 + 3.00 = 32.55$ parts NaCl per 100 parts of slag

Illustration 3

When a vanadium-bearing basic open hearth steel tap slag such as slag A, having a normal basicity ratio $$\frac{CaO}{SiO_2 + P_2O_5} = 2.49$$

as compared to the extremely low basicity ratio of 0.93 for the open hearth flush slag B, is treated by our preferred process, it is found to require almost double the quantity of roasting reagents, notwithstanding the fact that it carries only about ½ the vanadium content, for example:

Slag A analysis:
  2.89% $V_2O_5 \times 0.923 = 2.67\%$ CaO required for $Ca_3(VO_4)_2$
  12.78% $SiO_2$
  39.53% CaO
  3.07% $P_2O_5 \times 1.184 = \frac{3.64\% \text{ CaO}}{6.31\% \text{ CaO}}$ required for $Ca_3(PO_4)_2$
  39.53% CaO − 6.31% CaO = 33.22% CaO for $SiO_2$
By Reaction IV:
  33.22% CaO × 2.31 = 76.74% M. C. P. required
  33.22% CaO × 2.09 = 69.43% NaCl required
By Reaction I:
  2.89% $V_2O_5 \times 1.385 = 4.00\%$ M. C. P. required
  2.89% $V_2O_5 \times 0.643 = 1.86\%$ NaCl required
Total by Reactions I+IV:
  80.7% M. C. P. × 1.2 = 97 parts T. S. P. or about 46 parts $P_2O_5$ required per 100 parts slag
  71.3% NaCl = 71 parts NaCl required per 100 parts slag It will be noted from Illustration 3 that the calculated amount of Triple Superphosphate is 97 parts per 100 parts of slag and the calculated amount of NaCl is 71 parts per 100 parts of slag A. The slag was roasted and leached in accordance with our preferred procedure, using approximately the calculated amounts of roasting reagents in Test No. 1, but using different amounts in Tests Nos. 2, 3, 4 and 5.

The results obtained are shown in the following table:

TABLE 1

| Test No. | 1 | 2 | 3 | 4 | 5 |
|---|---|---|---|---|---|
| Roasting Mix (parts by weight): | | | | | |
| Open Hearth Tap Slag A | 100 | 100 | 100 | 100 | 100 |
| Triple Superphosphate (T. S. P.) | 100 | 100 | 75 | 50 | none |
| Salt (NaCl) | 70 | 20 | 20 | 20 | 20 |
| Roasting Conditions: | | | | | |
| Temperature, °F | 1,600 | 1,600 | 1,600 | 1,600 | 1,600 |
| Time at Temperature, Hours | 1½ | 1½ | 1½ | 1½ | 1½ |
| Water Soluble Vanadium, Percent | 64.9 | 42.0 | 23.2 | none | none |

From Table 1, it will be seen that no commercially feasible extraction of vanadium was obtained until the roasting reagents were used in substantially the proportions indicated by Reactions I and IV.

It will be noted that Slag B has a basicity ratio $$\frac{\text{Percent wt. CaO}}{\text{Percent wt. SiO}_2 + \text{percent wt. P}_2\text{O}_5}$$

of 0.93 and that the calculated amounts (see Example I, Illustration 1) to be used in the roasting mixture are 22 parts $P_2O_5$ and 32.6 parts NaCl per 100 parts of the slag. According to Illustration 3, slag A, which has a basicity ratio of 2.49, requires about 46 parts $P_2O_5$ and 71 parts NaCl per 100 parts of slag. As a general rule to be used in carrying out our invention, it may be stated that where the basicity ratio $$\frac{CaO}{SiO_2 + P_2O_5}$$

is low, the amounts of NaCl and active phosphorus-bearing compound will be low, but where this ratio is high, the amounts required will be high. Accordingly, if the basicity ratio is less than about 1.5, the vanadium-containing material usually requires about 8 to 40 parts by weight of NaCl and an active phosphorus-bearing compound in amount to provide about 16 to 24 parts by weight of $P_2O_5$ per 100 parts of the vanadium-containing material. However, where the vanadium-containing material has a basicity ratio of more than about 1.5, it usually requires about 60 to 80 parts by weight of NaCl and an active phosphorus-bearing compound in amount to provide about 30 to 60 parts by weight of $P_2O_5$ per 100 parts of vanadium-containing material.

EXAMPLE 2

A refractory Arizona carnotite ore analyzing:

| | Percent |
|---|---|
| $V_2O_5$ | 1.39 |
| $U_3O_8$ | 0.53 |
| $CaCO_3$ | 1.00 |
| Quartz gangue | 78–86 | was roasted according to known prior art at its optimum time and temperature (1600 F. for 1½ hours) with optimum amounts of NaCl (7.5%) and pyrite (3%). Its yield of water-soluble vanadium was 58.6%.

The same ore when roasted according to the present invention with 15% of NaCl and 2½% of Triple Superphosphate at 1450° F. for 1½ hours (optimum conditions for this mix), yielded 85% of its vanadium content as water-soluble vanadium.

EXAMPLE 3

A refractory vanadium-bearing Utah clay of the following analysis:

| | Percent |
|---|---|
| $V_2O_5$ | 1.00 |
| CaO | 10.40 |
| $SiO_2$ | 55.00 |
| $Al_2O_3$ | 7.50 |
| $P_2O_5$ | 6.24 | when roasted according to the present invention at 1500° F. for 1½ hours with 10% of Triple Superphosphate and 25% of NaCl yielded 65% of its vanadium content as water-soluble vanadium in solutions sufficiently free of $SiO_2$, $Al_2O_3$ and $P_2O_5$ to permit direct precipitation of $V_2O_5$ of satisfactory grade.

If this same clay is roasted with salt alone and water leached, the water-soluble vanadium amounts to only 10%. If sulphuric acid leaching of the salt roast is resorted to in order to obtain a vanadium extraction comparable to that obtained by our method, the acid liquors are so contaminated with $SiO_2$, $Al_2O_3$ and $P_2O_5$ that these impurities must be separated before precipitation of $V_2O_5$, thus causing losses in vanadium and additional expense.

EXAMPLE 4

The basic open hearth flush slag B of the analysis previously given was ground to 100 mesh, magnetically cleaned, and then leached with sulphuric acid having a concentration of 3 to 4% by weight and in an amount of 0.465 to 0.50 part of sulphuric acid to 1 part of slag. This extracted only about 1% of the total vanadium content, but caused 72.5% of the CaO, 68.0% of the $SiO_2$, 31.0% of the FeO, and 50.0% of the MnO to be taken into solution and caused the CaO to precipitate as gypsum along with the insoluble residue.

The gypsum was separated from the remaining insoluble residue by washing out the excess acid to about 5.5 pH, and applying a known flotation method, thereby producing a flotation concentrate having the analysis:

| | Percent |
|---|---|
| $V_2O_5$ | 8.07 |
| FeO | 28.60 |
| MnO | 13.89 |
| CaO | 11.96 |
| $SO_3$ | 2.38 |
| MgO | 2.42 |
| $SiO_2$ | 12.47 |

The flotation concentrate, amounting to 50 to 60% of the raw slag weight, was roasted for 1½ hours at 1600° F. with 21 parts of Triple Superphosphate and 10 parts of NaCl per 100 parts of concentrate. The roast yielded about 73% of its vanadium content as water-soluble vanadium. The tailings from the water leach, containing 0.97% vanadium, were then digested in sulphuric acid as previously described, which resulted in a further recovery of 14 to 16% of vanadium, and recovery of at least 90% of the phosphorus content of the water-leached residue.

Referring in general to our process, from Reaction I it is evident that $P_2O_5$ is needed in the roast for splitting off the CaO of the $3CaO.V_2O_5$ and for combining with the CaO thus split off to fix it in the form of water-insoluble tetracalcium phosphate $4CaO.P_2O_5$. From Reaction IV, it can be seen that $P_2O_5$ is needed for combining with the CaO of the dicalcium silicate $2CaO.SiO_2$ in order to form the water-insoluble double lime-soda silicophosphate. Thus in the case where the slag or other vanadium-containing material to be roasted contains substantial amounts of CaO and $SiO_2$, the active phosphorus-bearing compound in the roast should be in amount to provide $P_2O_5$ at least sufficient to combine with the CaO of the calcium orthovanadate and to combine with the dicalcium silicate to form water-insoluble phosphates. $P_2O_5$ need not be provided for that part of the CaO in the vanadium-containing material which is already combined as water-insoluble calcium phosphate. Thus it can be seen that in accordance with our invention, where the vanadium-containing material contains substantial amounts of CaO and $SiO_2$, the active phosphorus-bearing compound in the roast should be in amount to provide $P_2O_5$ at least sufficient to combine with substantially all of the CaO in the vanadium-containing material which is not already combined as water-insoluble calcium phosphate.

By reference to Reaction I, it will be seen that NaCl is needed to combine with the $V_2O_5$ content of the vanadium-containing material in order to form the water-soluble sodium metavanadate. From Reaction IV, it can be seen that NaCl also is needed to combine with the dicalcium silicate and phosphorus to form the water-insoluble double lime-soda silicophosphate. Thus in carrying out our invention, where the vanadium-containing material contains substantial amounts of CaO and $SiO_2$, the NaCl in the roast should be in amount at least sufficient to combine with all of the vanadium oxide of the water-insoluble vanadium compound to form water-soluble sodium metavanadate and with the dicalcium silicate of the vanadium-containing material and with phosphorus to form water-insoluble lime-soda silicophosphate.

In those cases where the vanadium-containing material does not contain a substantial amount of $SiO_2$, the active phosphorus-bearing compound in the roast should be in amount to provide $P_2O_5$ at least sufficient to combine with all of the CaO in the vanadium-containing material which is not already combined as water-insoluble calcium phosphate and the NaCl in the roast should be in amount at least sufficient to combine with all the vanadium oxide of the water-insoluble vanadium compound to form water-soluble sodium metavanadate.

The amount of active phosphorus-bearing compound used in the roast preferably is not more than that amount which will result in over 1 part of $P_2O_5$ to 20 parts of $V_2O_5$ by weight in the water-leach liquor containing sodium metavanadate.

The amount of NaCl used in the mixture preferably is such that the roasted mixture contains not over about 3% of residual NaCl. If the amount of residual NaCl in the roasted mixture is increased, the amount of NaCl in the water-leach solution increases. Where the amount of NaCl in the water-leach is excessive, it tends to salt out the vanadium rather than keeping it in solution; the latter is desired so that a strong vanadium solution can be formed.

The invention is not limited to the preferred embodiment, but may be otherwise embodied or practiced within the scope of the following claims.

We claim:

1. In a process for extracting vanadium values from vanadium-containing material containing substantially water-insoluble compounds of vanadium oxide combined with at least one basic oxide of the group consisting of CaO, MgO, FeO and MnO, the steps comprising mixing the comminuted vanadium-containing material with NaCl and an active phosphorus-bearing compound of the group consisting of monosodium orthophosphate, sodium pyrophosphate, monocalcium phosphate, the commercial form of monocalcium phosphate monohydrate containing 46–48% available $P_2O_5$, phosphorus pentoxide and phosphoric acid, roasting said mixture to form water-soluble sodium metavanadate and water-insoluble compounds of said basic oxides, and water-leaching the roast to extract sodium metavanadate.

2. A process according to claim 1, wherein the active phosphorus-bearing compound is phosphoric acid $H_3PO_4$.

3. A process according to claim 1, wherein the active phosphorus-bearing compound is the commercial form of monocalcium phosphate monohydrate, 46–48% available $P_2O_5$.

4. A process according to claim 1, comprising the additional steps of digesting the water-leached residue in sulphuric acid to convert the water-insoluble phosphates to phosphoric acid and convert the residual water-insoluble vanadium to acid-soluble vanadium, mixing the phosphoric acid liquor containing vanadium and other acid-soluble salts in solution with NaCl and a further quantity of said vanadium-containing material, roasting said mixture to convert the vanadium to water-soluble sodium metavanadate, to convert the phosphoric acid to water-insoluble phosphate and to convert the other acid-soluble salts to water-insoluble compounds, and water-leaching it to extract sodium metavanadate.

5. In a process for extracting vanadium values from vanadium-containing material containing substantially water-insoluble compounds of vanadium oxide combined with at least one basic oxide of the group consisting of CaO, MgO, FeO and MnO, the steps comprising mixing the comminuted vanadium-containing material with NaCl and an active phosporus-bearing compound of the group consisting of monosodium orthophosphate, sodium pyrophosphate, monocalcium phosphate, the commercial form of monocalcium phosphate monohydrate containing 46–48% available $P_2O_5$, phosphorus pentoxide and phosphoric acid, roasting said mixture to form water-soluble sodium metavanadate and water-insoluble compounds of said basic oxides, and water-leaching the roast to extract sodium metavanadate, the NaCl in the roast being in amount at least sufficient to combine with all of the vanadium oxide of said water-insoluble vanadium compound to form water-soluble sodium metavanadate, the active phosphorus-bearing compound in the roast being in amount to provide $P_2O_5$ at least sufficient to combine with all of said basic oxides in the vanadium-containing material which are not already combined as water-insoluble phosphates.

6. In a process for extracting vanadium values from vanadium-containing material containing substantially water-insoluble compounds of vanadium oxide combined with at least one basic oxide of the group consisting of CaO, MgO, FeO and MnO, the steps comprising mixing the comminuted vanadium-containing material with NaCl and phosphoric acid, the NaCl in the mixture being in amount at least sufficient to combine with all of the vanadium oxide of said water-insoluble vanadium compound to form water-soluble sodium metavanadate, the phosphoric acid in the mixture being in amount at least sufficient to combine with all of said basic oxides in the vanadium-containing material which are not already combined as water-insoluble phosphates, roasting said mixture to form water-soluble sodium metavanadate and water-insoluble phosphates, and water leaching the roast to extract sodium metavanadate.

7. A process according to claim 6, comprising the additional steps of producing phosphoric acid liquor by digesting the water-leached residue in sulphuric acid to convert the water-insoluble phosphates to phosphoric acid and convert the residual water-insoluble vanadium to acid-soluble vanadium, mixing the phosphoric acid liquor containing vanadium and other acid-soluble salts in solution, with NaCl and a further quantity of said vanadium-containing material, the NaCl in the mixture being in amount at least sufficient to combine with all of the vanadium oxide of said water-insoluble vanadium compound to form water-soluble sodium metavanadate, the phosphoric acid in the mixture being in amount at least sufficient to combine with all of said basic oxides in the vanadium-containing material which are not already combined as water-insoluble phosphates, roasting said mixture to convert the vanadium to water-soluble sodium metavanadate, to convert the phosphoric acid to water-insoluble phosphates and to convert the other acid-soluble salts to water-insoluble compounds, and water leaching it to extract sodium metavanadate.

8. In a process for extracting vanadium values from vanadium-containing material containing substantially water-insoluble compounds of vanadium oxide combined with CaO and containing also $SiO_2$ and having a basicity ratio $$\frac{\text{Percent wt. CaO}}{\text{Percent wt. SiO}_2+\text{Percent wt. P}_2\text{O}_5}$$

of less than about 1.5, the steps comprising mixing the comminuted vanadium-containing material with about 8 to 40 parts by weight of NaCl per 100 parts of vanadium-containing material and with an active phosphorus-bearing compound of the group consisting of monosodium orthophosphate, sodium pyrophosphate, monocalcium phosphate, the commercial form of monocalcium phosphate monohydrate containing 46–48% available $P_2O_5$, phosphorus pentoxide and phosphoric acid, in amount to provide about 16 to 24 parts by weight of $P_2O_5$ per 100 parts by weight of vanadium-containing material, roasting said mixture to form water-soluble sodium metavanadate and water-insoluble phosphates, and water-leaching the roast to extract sodium metavanadate.

9. A process according to claim 8, wherein the active phosphorus-bearing compound is the commercial form of monocalcium phosphate monohydrate containing 46–48% available $P_2O_5$.

10. A process according to claim 8, wherein the active phosphorus-bearing compound is phosphoric acid, $H_3PO_4$.

11. In a process for extracting vanadium values from vanadium-containing material containing substantially water-insoluble compounds of vanadium oxide combined with CaO and containing also $SiO_2$ and having a basicity ratio $$\frac{\text{Percent wt. CaO}}{\text{Percent wt. SiO}_2+\text{Percent wt. P}_2\text{O}_5}$$

of more than about 1.5, the steps comprising mixing the comminuted vanadium-containing material with about 60 to 80 parts by weight of NaCl per 100 parts of vanadium-containing material and with an active phosphorus-bearing compound of the group consisting of monosodium orthophosphate, sodium pyrophosphate, monocalcium phosphate, the commercial form of monocalcium phosphate monohydrate containing 46–48% available $P_2O_5$, phosphorus pentoxide and phosphoric acid, in amount to provide about 30 to 60 parts by weight of $P_2O_5$ per 100 parts of vanadium-containing material, roasting said mixture to form water-soluble sodium metavanadate and water-insoluble phosphates, and water-leaching the roast to extract sodium metavanadate.

References Cited in the file of this patent

UNITED STATES PATENTS

| 2,168,169 | Meyer | Aug. 1, 1939 |
| 2,640,754 | Lundquist | June 2, 1953 |

FOREIGN PATENTS

| 492,212 | Great Britain | Sept. 16, 1938 |

U. S. DEPARTMENT OF COMMERCE
PATENT OFFICE

CERTIFICATE OF CORRECTION

Patent No. 2,822,240                                                       February 4, 1958

Holbert E. Dunn et al.

It is hereby certified that error appears in the printed specification of the above numbered patent requiring correction and that the said Letters Patent should read as corrected below.

Column 1, line 20, for "MgF" read -- FeO --; line 67, for "$2NaVO_o$" read -- $2NaVO_3$ --; column 4, line 15, for "leachings" read -- leached --.

Signed and sealed this 15th day of April 1958.

(SEAL)
Attest:

KARL H. AXLINE
Attesting Officer

ROBERT C. WATSON
                                                                    Commissioner of Patents